(12) United States Patent
Pulleti et al.

(10) Patent No.: US 9,426,674 B2
(45) Date of Patent: Aug. 23, 2016

(54) PLANNING A WIRELESS NETWORK

(71) Applicant: Honeywell International Inc., Morristown, NJ (US)

(72) Inventors: Uday K. Pulleti, Machilipatnam (IN); Patrick Gonia, Maplewood, MN (US); Arun Vijayakumari Mahasenan, Trivandrum (IN); Vinayak Sadashiv Kore, Bangalore (IN); Andrew G. Berezowski, Wallingford, CT (US)

(73) Assignee: Honeywell International Inc., Morris Plains, NJ (US)

( * ) Notice: Subject to any disclaimer, the term of this patent is extended or adjusted under 35 U.S.C. 154(b) by 133 days.

(21) Appl. No.: 14/171,447

(22) Filed: Feb. 3, 2014

(65) Prior Publication Data

US 2015/0223080 A1 Aug. 6, 2015

(51) Int. Cl.
*H04W 24/02* (2009.01)
*H04W 16/18* (2009.01)
*G05D 1/02* (2006.01)

(52) U.S. Cl.
CPC ............. *H04W 24/02* (2013.01); *G05D 1/0219* (2013.01); *G05D 1/0246* (2013.01); *H04W 16/18* (2013.01)

(58) Field of Classification Search
CPC ..... H04W 24/02; H04W 24/00; H04W 16/24; H04W 16/18; H04W 16/02
See application file for complete search history.

(56) References Cited

U.S. PATENT DOCUMENTS

| | | | | |
|---|---|---|---|---|
| 6,336,035 B1* | 1/2002 | Somoza | ................ | H04W 16/18 455/423 |
| 6,397,063 B1* | 5/2002 | Sessions | ................ | H04B 17/27 455/425 |
| 7,299,069 B2* | 11/2007 | Claussen | ............... | H04W 24/02 455/446 |
| 7,457,619 B2* | 11/2008 | Ariyur | .................. | H04W 16/18 370/316 |
| 7,620,394 B2* | 11/2009 | Good | .................. | H04B 7/18563 340/10.1 |
| 7,773,985 B2* | 8/2010 | Horton | .................. | H04W 16/18 455/115.1 |

(Continued)

OTHER PUBLICATIONS

Next-Generation Aerial Image Processing Software. PIX4D. Sep. 25, 2013. http://www.pix4d.com. 4 pages.

(Continued)

*Primary Examiner* — Matthew Sams
(74) *Attorney, Agent, or Firm* — Brooks, Cameron & Huebsch, PLLC

(57) ABSTRACT

Planning a wireless network is described herein. One method includes navigating a first unmanned mobile vehicle to a location in an environment, navigating a second unmanned mobile vehicle along a route through the environment, capturing, by the second unmanned mobile vehicle while navigating along the route, data associated with a wireless signal emitted by the first unmanned mobile vehicle at the location and locations of the second unmanned mobile vehicle while the second unmanned mobile vehicle is capturing the data associated with the wireless signal, and determining locations to place a number of wireless network access points in the environment based on the captured data.

20 Claims, 2 Drawing Sheets

(56) References Cited

U.S. PATENT DOCUMENTS

| | | | | |
|---|---|---|---|---|
| 7,970,506 B2* | 6/2011 | DeMarco | G05D 1/104 | |
| | | | 342/20 | |
| 2003/0050754 A1* | 3/2003 | Edwards | H04W 24/00 | |
| | | | 701/409 | |
| 2005/0080586 A1* | 4/2005 | Kanevsky | H04W 24/10 | |
| | | | 702/127 | |
| 2005/0288009 A1* | 12/2005 | Poletti | H04W 24/00 | |
| | | | 455/423 | |
| 2006/0203746 A1* | 9/2006 | Maggenti | H04L 41/0806 | |
| | | | 370/254 | |
| 2006/0211413 A1* | 9/2006 | Ariyur | H04W 16/18 | |
| | | | 455/423 | |
| 2007/0010241 A1* | 1/2007 | Wachter | H04W 24/02 | |
| | | | 455/423 | |
| 2007/0250260 A1* | 10/2007 | Ariyur | G01S 3/7864 | |
| | | | 701/519 | |
| 2008/0118621 A1 | 5/2008 | Sibilla | | |
| 2009/0005052 A1* | 1/2009 | Abusch-Magder | H04W 24/02 | |
| | | | 455/446 | |
| 2010/0022255 A1* | 1/2010 | Singhal | G08G 1/20 | |
| | | | 455/457 | |
| 2010/0273504 A1* | 10/2010 | Bull | G01S 5/02 | |
| | | | 455/456.1 | |
| 2012/0271491 A1* | 10/2012 | Spata | G01W 1/00 | |
| | | | 701/3 | |
| 2013/0017796 A1* | 1/2013 | Milner | H04W 24/02 | |
| | | | 455/67.13 | |
| 2014/0220923 A1* | 8/2014 | Shoshan | H04W 84/005 | |
| | | | 455/404.1 | |
| 2014/0233099 A1* | 8/2014 | Stark | G09F 21/06 | |
| | | | 359/446 | |
| 2014/0349696 A1* | 11/2014 | Hyde | H04W 24/02 | |
| | | | 455/517 | |
| 2016/0028471 A1* | 1/2016 | Boss | H04B 7/18504 | |
| | | | 455/406 | |

OTHER PUBLICATIONS

Search Report from related European Patent Application 15152212.5 dated Jul. 3, 2015 (7 pp).

* cited by examiner

PLANNING A WIRELESS NETWORK

TECHNICAL FIELD

The present disclosure relates to planning a wireless network.

BACKGROUND

Wireless networks, such as, for example, wireless networks in industrial plants, can have many applications, such as, for instance, tracking applications (e.g., monitoring the location of individuals in the plant) and safety applications (e.g., monitoring the plant for fire or harmful chemicals). As such, the location of the access points (e.g., communication nodes) of the wireless network should be planned to ensure that the quality of the network (e.g., network latency, redundancy, connectivity, signal coverage, etc.) is sufficient to perform these applications.

However, the environment, topology, types of materials, and/or objects of where the wireless network is to be deployed, among other factors, can make planning a wireless network (e.g., the location of the access points of the wireless network) difficult. For example, some previous approaches for planning wireless networks may include conducting surveys, such as radio frequency (RF) and/or received signal strength indicator (RSSI) surveys, of where the network is to be deployed, creating a model and/or map of where the network is to be deployed (e.g., using ranging equipment), and/or manually deploying the access points by a trial and error method. Such approaches, however, can be costly and/or time consuming, and/or may not meet the quality requirements of the network.

DETAILED DESCRIPTION

Figure 1:
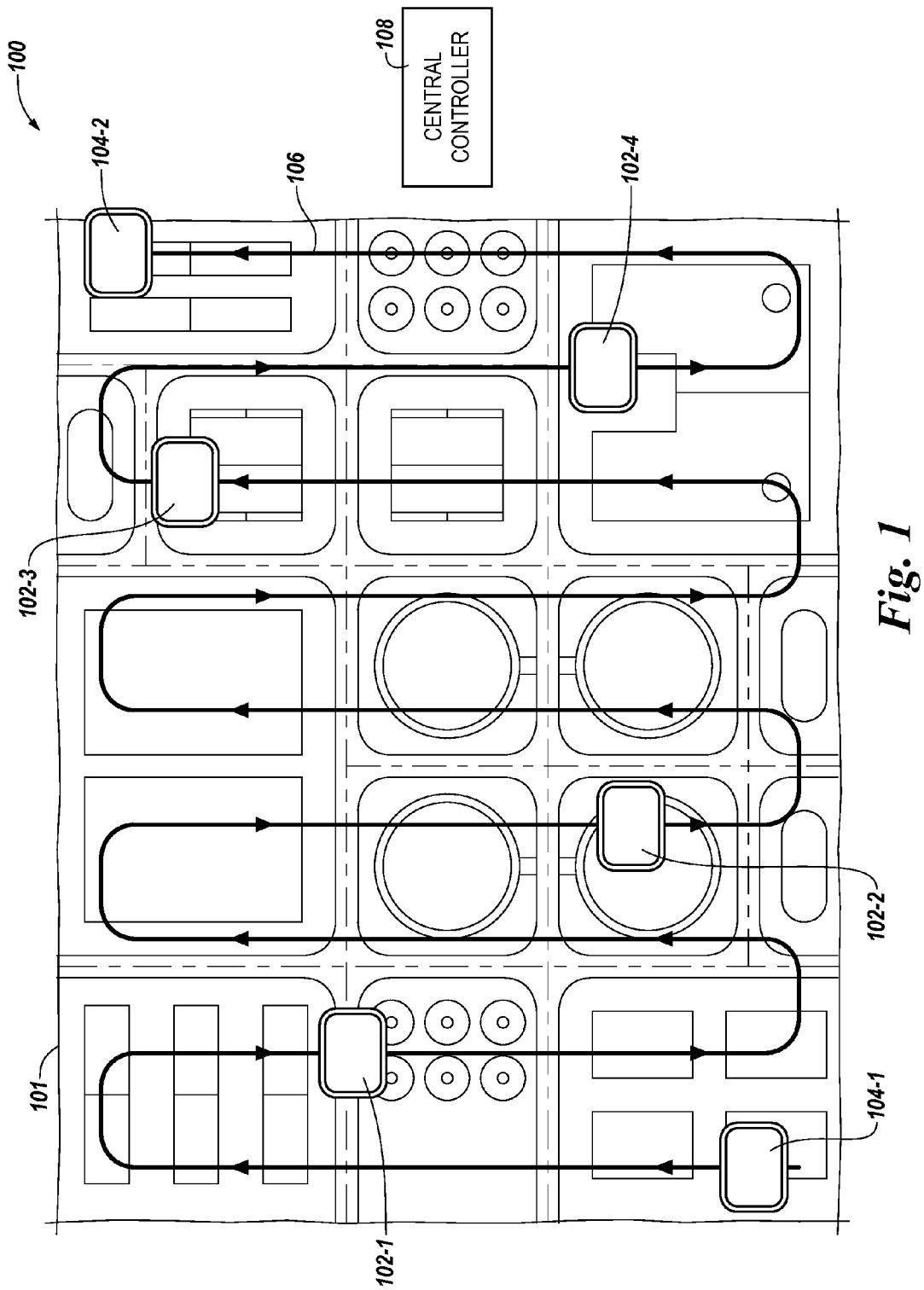
FIG. 1 illustrates a system for planning a wireless network in accordance with one or more embodiments of the present disclosure.

Planning a wireless network is described herein. For example, one or more embodiments include navigating a first unmanned mobile vehicle to a location in an environment, navigating a second unmanned mobile vehicle along a route through the environment, capturing, by the second unmanned mobile vehicle while navigating along the route, data associated with a wireless signal emitted by the first unmanned mobile vehicle at the location and locations of the second unmanned mobile vehicle while the second unmanned mobile vehicle is capturing the data associated with the wireless signal, and determining locations to place a number of wireless network access points in the environment based on the captured data.

Planning a wireless network in accordance with one or more embodiments of the present disclosure (e.g., using unmanned mobile vehicles) can be less difficult, costly, and/or time consuming than previous wireless network planning approaches. Further, planning a wireless network in accordance with one or more embodiments of the present disclosure can ensure that the quality of the network (e.g., network latency, redundancy, connectivity, signal coverage, etc.) is sufficient to perform the intended applications of the network.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced by 202 in FIG. 2.

As used herein, "a" or "a number of" something can refer to one or more such things. For example, "a number of mobile vehicles" can refer to one or more mobile vehicles.

FIG. 1 illustrates a system 100 for planning a wireless network for an environment 101 in accordance with one or more embodiments of the present disclosure. Environment 101 can be, for example, an industrial plant. However, embodiments of the present disclosure are not so limited. For example, in some embodiments, environment 101 can be a commercial building, home, or outdoor environment such as a city center, suburban area, or urban environment.

As shown in FIG. 1, system 100 can include a first number of unmanned mobile vehicles (e.g., unmanned mobile vehicles 102-1, 102-2, 102-3, and 102-4) and a second number of unmanned mobile vehicles (e.g., unmanned mobile vehicles 104-1 and 104-2). The first number of unmanned mobile vehicles (e.g., vehicles 102-1, 102-2, 102-3, and 102-4) can be referred to as anchor vehicles, and the second number of unmanned mobile vehicles (e.g., vehicles 104-1 and 104-2) can be referred to as probe vehicles. Although the embodiment illustrated in FIG. 1 includes four anchor vehicles and two probe vehicles, embodiments of the present disclosure are not limited to a particular number of anchor vehicles or probe vehicles.

As used herein, an unmanned mobile vehicle (e.g., vehicles 102-1, 102-2, 102-3, 102-4, 104-1, and 104-2) can refer to a vehicle that does not have a human driver or pilot on board, and whose navigation (e.g., travel) is controlled autonomously by an on-board computing system and/or by a human or computer via remote control. For example, unmanned mobile vehicles 102-1, 102-2, 102-3, 102-4, 104-1, and 104-2 can be unmanned aerial vehicles (e.g., drones) and/or ground-based (e.g., wheeled) unmanned vehicles.

Anchor vehicles 102-1, 102-2, 102-3, and 102-4 can navigate (e.g., travel) to a number of locations in environment 101. For example, anchor vehicles 102-1, 102-2, 102-3, and 102-4 can be powered up at a single (e.g., the same) location in environment 101, and then each anchor vehicle can navigate to a different location in environment 101 (e.g., anchor vehicle 102-1 can navigate to a first location in environment 101, anchor vehicle 102-2 can navigate to a second location in environment 101, anchor vehicle 102-3 can navigate to a third location in environment 101, and anchor vehicle 102-4 can navigate to a fourth location in environment 101). As an additional example, in embodiments in which anchor vehicles 102-1, 102-2, 102-3, and 102-4 are unmanned aerial vehicles, the anchor vehicles can navigate to their respective locations by moving in the air space above environment 101.

The example illustrated in FIG. 1 shows each anchor vehicle 102-1, 102-2, 102-3, and 102-4 at its respective location in environment 101. However, embodiments of the present disclosure are not limited to the locations illustrated in FIG. 1.

After anchor vehicles 102-1, 102-2, 102-3, and 102-4 have navigated to their respective locations in environment 101, they can emit wireless signals at their respective locations (e.g., anchor vehicle 102-1 can emit a wireless signal at its location, anchor vehicle 102-2 can emit a wireless signal at its location, etc.). For example, anchor vehicles 102-1, 102-2, 102-3, and 102-4 can include wireless radios that can emit radio frequency (RF) signals, as will be further described herein (e.g., in connection with FIG. 2A). That is, anchor vehicles 102-1, 102-2, 102-3 and 102-4 can emulate wireless network access points (e.g., communication nodes) located at their respective locations in environment 101.

After anchor vehicles 102-1, 102-2, 102-3, and 102-4 have begun emitting wireless signals at their respective locations, probe vehicles 104-1 and 104-2 can navigate (e.g., travel) along a number of routes through environment 101. For example, in the embodiment illustrated in FIG. 1, probe vehicles 104-1 and 104-2 can navigate along the same route (e.g., route 106) through environment 101. However, embodiments of the present disclosure are not so limited. For example, in some embodiments, each probe vehicle can navigate along a different route through environment 101 (e.g., probe vehicle 104-1 can navigate along a first route through environment 101, and probe vehicle 104-2 can navigate along a second route through environment 101). The different routes may and/or may not overlap (e.g., partially overlap) and/or intersect with (e.g., cross) each other.

Anchor vehicles 102-1, 102-2, 102-3, and 102-4 and probe vehicles 104-1 and 104-2 can use a number of augmenting location detection techniques for accurate navigation and positioning, such as, for example, sound based, video/imaging based, RF triangulations, inertial and geomagnetic, pressure sensor based, and/or GPS based location detection techniques. Further, anchor vehicles 102-1, 102-2, 102-3, and 102-4 and probe vehicles 104-1 and 104-2 can navigate intelligently (e.g. use an intelligent navigation scheme) to avoid collisions that can cause damage to property, personnel, and/or themselves. The navigation (e.g., intelligent navigation scheme) of anchor vehicles 102-1, 102-2, 102-3, and 102-4 and probe vehicles 104-1 and 104-2 can follow safety regulations to allow for navigation in hazardous and/or explosive areas such as refineries and chemical plants, and/or can be fail safe in the event of radio communication loss, mechanical failures, battery failures, etc.

In embodiments in which probe vehicles 104-1 and/or 104-2 are unmanned aerial vehicles, probe vehicles 104-1 and/or 104-2 can navigate along route 106 by moving in the air space above environment 101. For instance, in some embodiments, probe vehicles 104-1 and/or 104-2 can navigate along route 106 at different heights above the environment. For example, probe vehicles 104-1 and/or 104-2 can navigate along route 106 at a height of two meters above the environment, then navigate along route 106 at a height of four meters above the environment, then navigate along route 106 at a height of six meters above the environment, and so on, until a pre-defined height is reached. However, embodiments of the present disclosure are not limited to particular heights, or to a particular number of different heights.

In the example illustrated in FIG. 1, route 106 is a straight line route, such that probe vehicles 104-1 and/or 104-2 navigate in straight lines in different directions through environment 101. However, embodiments of the present disclosure are not limited to the particular route (e.g., the particular straight line route) illustrated in FIG. 1.

In the example illustrated in FIG. 1, route 106 can begin and end at different positions (e.g., locations) in environment 101. That is, the initial position of probe vehicles 104-1 and/or 104-2 (e.g., the position of probe vehicles 104-1 and/or 104-2 at the beginning of route 106) can be different than the final position of probe vehicles 104-1 and/or 104-2 (e.g., the position of probe vehicles 104-1 and/or 104-2 at the end of route 106). However, embodiments of the present disclosure are not so limited. For example, in some embodiments, the route can begin and end at the same position in environment 101. That is, the initial and final positions of probe vehicles 104-1 and/or 104-2 can be the same.

While navigating along route 106, probe vehicles 104-1 and 104-2 can capture (e.g., measure) data associated with the wireless signals emitted by anchor vehicles 102-1, 102-2, 102-3, and 102-4 at their respective locations. For example, probe vehicles 104-1 and 104-2 can capture the strength of the wireless signals, the bandwidth of the signals, and/or the amount of interference associated with the signals, among other data associated with the wireless signals, while navigating along route 106. Probe vehicles 104-1 and 104-2 can include wireless radios that can capture the data associated with the wireless signals, as will be further described herein (e.g., in connection with FIG. 2B). Probe vehicles 104-1 and 104-2 can also capture (e.g., record) their locations (e.g., where they are) while capturing the data associated with the wireless signals.

In some embodiments, anchor vehicles 102-1, 102-2, 102-3, and 102-4 can place wireless radios at their respective locations, and wireless signals emitted by the wireless radios at their respective locations can be manually captured (e.g., by an individual manually walking around in environment 101.

Locations to place (e.g., install) a number of wireless network access points in environment 101 can then be determined based on the captured data. For example, if the captured data indicates that the quality requirements of the wireless network (e.g., network latency, redundancy, connectivity, signal coverage, etc.) for environment 101 are met, wireless network access points can be installed at the locations of anchor vehicles 102-1, 102-2, 102-3, and 102-4.

If, however, the captured data indicates that the quality requirements of the wireless network for environment 101 are not met, each anchor vehicle 102-1, 102-2, 102-3, and 102-4 can navigate to another different location in environment 101 and emit wireless signals at their other different (e.g., new) locations. After anchor vehicles 102-1, 102-2, 102-3, and 102-4 have begun emitting wireless signals at their new locations, probe vehicles 104-1 and 104-2 can again navigate along route 106 through environment 101, and capture data associated with the wireless signals emitted by anchor vehicles 102-1, 102-2, 102-3, and 102-4 at their new locations.

Locations to place the number of wireless network access points in environment 101 can then be determined based on the captured data associated with the wireless signals emitted by anchor vehicles 102-1, 102-2, 102-3, and 102-4 at their new locations. For example, if this captured data indicates that the quality requirements of the wireless network for environment 101 are met, wireless network access points can be installed at the new locations of anchor vehicles 102-1, 102-2, 102-3, and 102-4. If the quality requirements of the wireless network are still not, the process can continue in an analogous manner until it is determined that the quality requirements are met. In some embodiments, the locations to place the number of wireless network access points can be determined by probe vehicles 104-1 and 104-2.

As shown in FIG. 1, system 100 can include a central controller 108. Central controller 108 can be, for example, a laptop computer, a desktop computer, or a mobile device (e.g., a mobile phone, a smart phone, a personal digital assistant, etc.), among other types of computing devices, and can be located remotely from anchor vehicles 102-1, 102-2, 102-3, and 102-4, and probe vehicles 104-1 and 104-2.

In some embodiments, the operation of anchor vehicles 102-1, 102-2, 102-3, and 102-4, and the operation of probe vehicles 104-1 and 104-2, can be remotely controlled by central controller 108 (e.g., via a direct communication link such as a radio link, a wired or wireless network, or a removable memory). For instance, central controller 108 can instruct anchor vehicles 102-1, 102-2, 102-3, and 102-4 to navigate to, and emit wireless signals at, their respective locations in environment 101, and central controller 108 can instruct probe vehicles 104-1 and 104-2 to navigate along route 106 and capture data associated with the wireless signals.

As an example, central controller 108 can pre-program into anchor vehicles 102-1, 102-2, 102-3, and 102-4 the respective locations in environment 101 to which the anchor vehicles are to navigate, and central controller 108 can pre-program route 106 into probe vehicles 104-1 and 104-2. That is, the respective locations in environment 101 to which anchor vehicles 102-1, 102-2, 102-3, and 102-4 are to navigate, and route 106, can be pre-determined and programmed into the anchor vehicles and probe vehicles, respectively, before the anchor vehicles and probe vehicles begin their respective navigations.

Figure 2A:
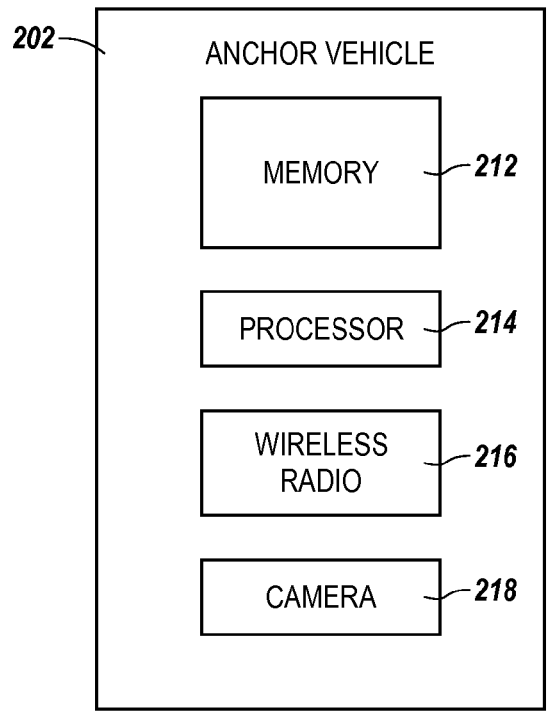
FIGS. 2A and 2B illustrate block diagrams of unmanned mobile vehicles for planning a wireless network in accordance with one or more embodiments of the present disclosure.
Figure 2B:
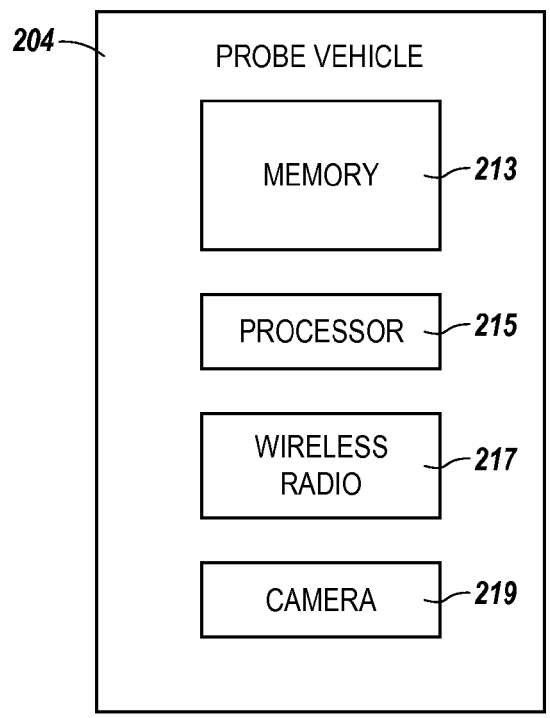

As an additional example, anchor vehicles 102-1, 102-2, 102-3, and 102-4, and probe vehicles 104-1 and 104-2, can include a camera that can capture images of environment 101, as will be further described herein (e.g., in connection with FIGS. 2A and 2B). Central controller 108 (e.g., a user of central controller 108) can use the captured images to monitor and control the navigation of anchor vehicles 102-1, 102-2, 102-3, and 102-4, and probe vehicles 104-1 and 104-2.

Further, the cameras of anchor vehicles 102-1, 102-2, 102-3, and 102-4 can determine whether a line of sight exists between the anchor vehicles (e.g., between the respective locations of the anchor vehicles). If a line of sight exists between the anchor vehicles, it can be determined that a line of sight would exist between wireless network access points placed at the respective locations of the anchor vehicles.

Further, in some embodiments, probe vehicles 104-1 and 104-2 can transmit (e.g., using their wireless radios) the data captured by the probe vehicles (e.g., the data associated with the wireless signals emitted by anchor vehicles 102-1, 102-2, 102-3, and 102-4) to central controller 108. For example, probe vehicles 104-1 and 104-2 can transmit the captured data to central controller 108 as the data is captured (e.g., the captured data can be streamed live to central controller 108), or probe vehicles 104-1 and 104-2 can store the data as it is being captured, and then subsequently (e.g., after the probe vehicles have finished navigating route 106) transmit the stored data to central controller 108. Central controller 108 can then instruct anchor vehicles 102-1, 102-2, 102-3, and 102-4 to navigate to different (e.g., new) locations in environment 101, and emit wireless signals at their new locations, based on the captured data (e.g., if the captured data indicates that the quality requirements of the wireless network for environment 101 are not met).

In some embodiments, anchor vehicles 102-1, 102-2, 102-3, and 102-4, and probe vehicles 104-1 and 104-2, can operate autonomously (e.g., without being controlled by, or receiving instructions from, central controller 108). For instance, anchor vehicles 102-1, 102-2, 102-3, and 102-4 can autonomously navigate to, and emit wireless signals at, their respective locations in environment 101, and probe vehicles 104-1 and 104-2 can autonomously navigate along route 106 and capture data associated with the wireless signals.

As an example, anchor vehicles 102-1, 102-2, 102-3, and 102-4, and probe vehicles 104-1 and 104-2, can include (e.g., store) a map of environment 101. Anchor vehicles 102-1, 102-2, 102-3, and 102-4 can navigate to their respective locations (e.g., deploy themselves) in environment 101 using (e.g., by following) the map, and probe vehicles 104-1 and 104-2 can navigate along route 106 using (e.g., by following) the map. Further, if anchor vehicles 102-1, 102-2, 102-3, and 102-4 and/or probe vehicles 104-1 and 104-2 determine during their navigation that there is a discrepancy between the map and environment 101 (e.g., that the map is inaccurate), they can update (e.g., correct) the map accordingly. Anchor vehicles 102-1, 102-2, 102-3, and 102-4 and probe vehicles 104-1 and 104-2 can determine whether there is a discrepancy between the map and environment 101 using a ranging device, for example. Further, anchor vehicles 102-1, 102-2, 102-3, and 102-4 and probe vehicles 104-1 and 104-2 can indicate on the map the respective locations to which the anchor vehicles navigate (e.g., the determined locations to place the wireless network access points).

Further, in some embodiments, probe vehicles 104-1 and 104-2 can determine the locations in environment 101 to place the wireless network access points, and transmit (e.g., using their wireless radios) the data captured by the probe vehicles (e.g., the data associated with the wireless signals emitted by anchor vehicles 102-1, 102-2, 102-3, and 102-4) to anchor vehicles 102-1, 102-2, 102-3, and 102-4 (e.g., to the wireless radios of the anchor vehicles). Anchor vehicles 102-1, 102-2, 102-3, and 102-4 can then determine whether to navigate to different (e.g., new) locations in environment 101, and emit wireless signals at their new locations, based on the captured data (e.g., the anchor vehicles may navigate to the new locations if the captured data indicates that the quality requirements of the wireless network for environment 101 are not met). Anchor vehicles 102-1, 102-2, 102-3, and 102-4 can make this determination using, for example, distributed data processing and/or centralized (e.g., cloud server) data processing.

Further, in some embodiments, probe vehicles 104-1 and 104-2 can predict the performance of wireless network access points placed at the locations of anchor vehicles 102-1, 102-2, 102-3, and 102-4 based on the captured data. For example, the data captured in a portion (e.g., small area) of the wireless network can be used to estimate wireless signal propagation characteristics of the network, which can be used to design the rest of the network (e.g., without actually capturing data throughout the entire network), thereby reducing the time and/or cost as compared with capturing data throughout the entire network. Such an example may be effective if the environment in which the network is to be deployed is homogenous.

Further, in some embodiments, probe vehicles 104-1 and 104-2 can predict the performance of wireless network access points placed at the locations of anchor vehicles 102-1, 102-2, 102-3, and 102-4 based on wireless signals emitted by wireless radios positioned at those locations. For example, the performance can be predicted based on a known difference between the performance of the access points and the performance of the wireless radio.

After the locations to place the number of wireless network access points in environment 101 have been determined, the wireless network access points can be placed (e.g., installed) at the determined locations. In some embodiments, the wireless network access points can be placed at the determined locations using anchor vehicles 102-1, 102-2, 102-3, and 102-4, and/or probe vehicles 104-1 and 104-2. For example, anchor vehicles 102-1, 102-2, 102-3, and 102-4, and/or probe vehicles 104-1 and 104-2, can include electromechanical appendages that can be used to install the access points at the determined locations.

In some embodiments, probe vehicles 104-1 and 104-2 can be used to perform diagnostics and/or monitoring of the wireless network for environment 101 after the wireless network access points have been placed at their determined locations. For example, after the wireless network access points have been placed at their determined locations, probe vehicles 104-1 and 104-2 can navigate along route 106, and capture data associated with wireless signals emitted by the wireless network access points while navigating along route 106. The captured data associated with the wireless signals emitted by the wireless network access points can be used to confirm operation of the wireless network (e.g., that the quality requirements of the network are being met), create a wireless signal profile (e.g., heat map and/or fingerprint that can indicate areas of the wireless network that lack coverage) for the wireless network, and/or determine the location accuracy of the wireless network (e.g., the degree of accuracy to which the wireless network can determine the location and/or position of mobile devices in environment 101).

FIGS. 2A and 2B illustrate block diagrams of unmanned mobile vehicles 202 and 204, respectively, for planning a wireless network for an environment in accordance with one or more embodiments of the present disclosure. Unmanned mobile vehicle 202 illustrated in FIG. 2A can be, for example, anchor vehicle 102-1, 102-2, 102-3, or 102-4 previously described in connection with FIG. 1, and unmanned mobile vehicle 204 illustrated in FIG. 2B can be, for example, probe vehicle 104-1 or 104-2 previously described in connection with FIG. 1.

As shown in FIGS. 2A and 2B, anchor vehicle 202 and probe vehicle 204 include memories 212 and 213, respectively, and processors 214 and 215, respectively. Memories 212 and 213 can be any type of storage medium that can be accessed by processors 214 and 215, respectively, to perform various examples of the present disclosure. For example, memories 212 and 213 can be non-transitory computer readable mediums having computer readable instructions (e.g., computer program instructions) stored thereon that are executable by processors 214 and 215, respectively, to perform various examples of the present disclosure. That is, processors 214 and 215 can execute the executable instructions stored in memories 212 and 213, respectively, to perform various examples of the present disclosure.

Memories 212 and 213 can be volatile or nonvolatile memory. Memories 212 and 213 can also be removable (e.g., portable) memory, or non-removable (e.g., internal) memory. For example, memories 212 and 213 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memories 212 and 213 are illustrated as being located in anchor vehicle 202 and probe vehicle 204, respectively, embodiments of the present disclosure are not so limited. For example, memories 212 and 213 can also be located internal to another computing resource (e.g., enabling computer readable instructions to be downloaded over the Internet or another wired or wireless connection).

As shown in FIGS. 2A and 2B, anchor vehicle 202 and probe vehicle 204 can include wireless radios 216 and 217, respectively. Wireless radio 216 of anchor vehicle 202 can emit wireless (e.g., RF) signals, as previously described herein (e.g., in connection with FIG. 1). Wireless radio 217 of probe vehicle 204 can capture data associated with the wireless signals emitted by wireless radio 216 of probe vehicle 202, as previously described herein (e.g., in connection with FIG. 1).

Further, anchor vehicle 202 and probe vehicle 204 can use wireless radios 216 and 217, respectively, to communicate with each other and/or with central controller 108 previously described in connection with FIG. 1. For example, wireless radio 217 of probe vehicle 204 can transmit the data it captures (e.g., the data associated with the wireless signals emitted by probe vehicle 202) to central controller 108, as previously described herein (e.g., in connection with FIG. 1). As an additional example, wireless radio 217 can transmit the data it captures to wireless radio 216 of anchor vehicle 202, as previously described herein (e.g., in connection with FIG. 1).

As shown in FIGS. 2A and 2B, anchor vehicle 202 and probe vehicle 204 can include cameras 218 and 219, respectively. Cameras 218 and 219 can capture images, such as, for example, images of an environment, as they navigate, as previously described herein (e.g., in connection with FIG. 1).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method of planning a wireless network, comprising:
navigating a first plurality of hover-capable unmanned mobile vehicles, wherein each respective one of the first plurality of unmanned mobile vehicles is navigated to a different location in an environment;
navigating a second plurality of hover-capable unmanned mobile vehicles, wherein each respective one of the second plurality of unmanned mobile vehicles is navigated along a different route through the environment after each of the first plurality of unmanned mobile vehicles has navigated to its respective location;
capturing, by each respective one of the second plurality of unmanned mobile vehicles while navigating along its respective route and while each of the first plurality of unmanned mobile vehicles is at its respective location, data associated with a wireless signal emitted by each respective one of the first plurality of unmanned mobile vehicles at its respective location and locations of the second plurality of unmanned mobile vehicles while the second plurality of unmanned mobile vehicles are capturing the data associated with each respective wireless signal; and
determining locations to place a number of wireless network access points in the environment based on the captured data.

2. The method of claim 1, wherein the method includes:
navigating one of the first plurality of unmanned mobile vehicles to an additional location in the environment;
capturing, by each respective one of the second plurality of unmanned mobile vehicles while navigating along its respective route, data associated with a wireless signal emitted by the one of the first plurality of unmanned mobile vehicles at the additional location; and
determining locations to place the number of wireless network access points in the environment based on the captured data associated with the wireless signal emitted by the one of the first plurality of unmanned mobile vehicles at the additional location.

3. The method of claim 1, wherein the method includes:
placing a wireless radio at each respective location of the first plurality of unmanned mobile vehicles using the first plurality of unmanned mobile vehicles; and
manually capturing data associated with a wireless signal emitted by the wireless radio at each respective location.

4. The method of claim 1, wherein:
the first plurality of unmanned mobile vehicles autonomously navigate to their respective locations; and
the second plurality of unmanned mobile vehicles autonomously navigate along their respective routes.

5. The method of claim 1, wherein the method includes:
determining the locations to place the number of wireless network access points by the second plurality of unmanned mobile vehicles;
transmitting, by the second plurality of unmanned mobile vehicles, the captured data to the first plurality of unmanned mobile vehicles; and
determining, by the first plurality of unmanned mobile vehicles, whether to navigate to an additional location in the environment based on the captured data.

6. The method of claim 1, wherein the method includes predicting, by the second plurality of unmanned mobile vehicles based on the captured data, performance of the wireless network access points when positioned at the determined locations.

7. The method of claim 1, wherein the method includes predicting, based on a wireless signal emitted by a wireless radio positioned at the determined locations, performance of the wireless network access points when positioned at the determined locations.

8. The method of claim 1, wherein the method includes placing the number of wireless network access points at the determined locations using the first plurality of unmanned mobile vehicles and/or the second plurality of unmanned mobile vehicles.

9. The method of claim 1, wherein the method includes storing, by the second plurality of unmanned mobile vehicles, the captured data.

10. A method of planning a wireless network, comprising:
navigating a first plurality of hover-capable unmanned mobile vehicles, wherein each respective one of the first plurality of unmanned mobile vehicles is navigated to a different location in an environment;
navigating a second plurality of hover-capable unmanned mobile vehicles, wherein each respective one of the second plurality of unmanned mobile vehicles is navigated along a different route through the environment after each of the first plurality of unmanned mobile vehicles has navigated to its respective location;
capturing, by each respective one of the second unmanned mobile vehicles while navigating along its respective route and while each of the first plurality of unmanned mobile vehicles is at its respective location, data associated with a wireless signal emitted by each respective one of the first plurality of unmanned mobile vehicles at its respective location;
determining locations to place a number of wireless network access points in the environment based on the captured data;
placing the number of wireless network access points at the determined locations;
navigating an additional unmanned mobile vehicle along an additional route through the environment after the number of wireless network access points are placed at the determined locations; and
capturing, by the additional unmanned mobile vehicle while navigating along the additional route after the number of wireless network access points are placed, data associated with wireless signals emitted by the wireless access points.

11. The method of claim 10, wherein the method includes:
confirming operation of the wireless network based on the captured data associated with the wireless signals emitted by the wireless access points.

12. The method of claim 10, wherein the method includes creating a wireless signal profile for the wireless network based on the captured data associated with the wireless signals emitted by the wireless access points.

13. A system for planning a wireless network, comprising:
a first plurality of unmanned mobile vehicles, wherein each respective one of the first plurality of unmanned mobile vehicles is configured to:
navigate to a different location in an environment; and
emit a wireless signal at its respective location; and
a second plurality of unmanned mobile vehicles, wherein each respective one of the second plurality of unmanned mobile vehicles is configured to:
navigate along a different route through the environment after each of the first plurality of unmanned mobile vehicles has navigated to its respective location; and
capture, while navigating along its respective route and while each of the first plurality of unmanned mobile vehicles is at its respective location, data associated with the wireless signals emitted by the first plurality of unmanned vehicles and locations of the second plurality of unmanned mobile vehicles while the second plurality of unmanned mobile vehicles are capturing the data associated with the wireless signals.

14. The system of claim 13, wherein the first plurality of unmanned mobile vehicles and the second plurality of unmanned mobile vehicles are configured to navigate autonomously.

15. The system of claim 13, wherein:
the first plurality of unmanned mobile vehicles and the second plurality of unmanned mobile vehicles include a map of the environment;
the first plurality of unmanned mobile vehicles are configured to navigate to their respective locations using the map;
the second plurality of unmanned mobile vehicles are configured to navigate along their respective routes using the map;
the first plurality of unmanned mobile vehicles and the second plurality of unmanned mobile vehicles are configured to update the map if the first plurality of unmanned mobile vehicles or the second plurality of unmanned mobile vehicles determine there is a discrepancy between the map and the environment; and
the first plurality of unmanned mobile vehicles and the second plurality of unmanned mobile vehicles are configured to indicate on the map the respective locations to which the first plurality of mobile vehicles navigate.

16. The system of claim 13, wherein the system includes a central controller configured to remotely control operation of the first plurality of unmanned mobile vehicles and the second plurality of unmanned mobile vehicles.

17. The system of claim 16, wherein the second plurality of unmanned mobile vehicles are configured to transmit the captured data to the central controller.

18. The system of claim 17, wherein the central controller is configured to instruct the first plurality of unmanned mobile vehicles to navigate to their respective locations in the environment based on the captured data.

19. The system of claim 13, wherein the first plurality of unmanned mobile vehicles include a wireless radio configured to emit the wireless signals.

20. The system of claim 13, wherein the first plurality of unmanned mobile vehicles include a camera configured to determine whether a line of sight exists between the first plurality of unmanned mobile vehicles at their respective locations.

* * * * *